3,018,155
PROCESS FOR THE MANUFACTURE OF
SOLUTIONS
Hans Gaertner, Basel, and Ernst Reich, Muttenz, Switzerland, assignors to Ciba Limited, Basel, Switzerland
No Drawing. Filed Mar. 4, 1957, Ser. No. 643,528
Claims priority, application Switzerland Mar. 5, 1956
4 Claims. (Cl. 8—83)

It is known that a large number of dyestuffs, owing to the presence of groups imparting solubility in water, are sufficiently soluble in aqueous baths or aqueous alkaline baths to be used for dyeing a very wide variety of fibrous materials from such baths. These dyestuffs naturally possess the disadvantage that when materials, especially textiles, dyed therewith are treated with aqueous baths such, for example, as are used for washing the materials, a certain amount of the dyestuff is usually removed from the treated goods. This is the case, for example, with almost all substantive dyestuffs.

Apart from these markedly water-soluble dyestuffs, there can be used dyestuffs which are practically insoluble in water and also in many other solvents, and which are usually referred to as pigments. To this group belong, for example, the azo dyestuffs free from groups imparting solubility in water which are widely used in industry, and especially the azo-dyestuffs which are applied in dyeing by the so-called ice color method. These dyestuffs may be derived, for example, from diazotized aminobenzene and simple substitution products thereof, on the one hand, and 2:3-hydroxynaphthoic acid arylides, pyrazolones or acylacetyl-amino-compounds on the other. In the ice color method of dyeing, the dyestuffs are produced by coupling on the fiber. In some cases they can be applied to the fiber in the form of intermediate products which contain groups imparting solubility in water, and then the groups imparting solubility in water are split off on the fiber.

It is also known that in certain cases the soluibility in water of dyestuffs which contain a heavy metal, such as copper, nickel, cobalt or chromium, in complex union can be improved by the addition of amines. In these cases it is supposed that the amine enters into complex union with the heavy metal and thereby improves the solubility in water.

The present invention is based on the observation that solutions of azo dyestuffs, which contain at least one group of weakly acid action and which are free from metal bound in complex union and are insoluble or insufficiently soluble in water, aqueous alkaline media or organic solvents, can be prepared remarkably easily by treating the dyestuff simultaneously with a substance of strongly basic action and a different weakly to moderately polar liquid which has a dielectric constant of at least 6 and an acidity less than that of ethyl alcohol.

As azo dyestuffs to be used in the process of this invention there are used all those in which at least the group of weakly acid action is present or can be formed by internal rearrangement under the action of a strong base. Such groups are, for example, hydroxyl groups bound to aromatic nuclei, carboxylic acid amide groups bound to or between aromatic nuclei, carboxylic acid amide groups forming a part of a heterocyclic ring, cyanuric acid amide groups, and enolisable groups in acyl acetyl-compounds and pyrazolone derivatives. The azo-dyestuff molecule may contain a single group of the aforesaid kind or two or more such groups which may be the same or different from one another. The azo dyestuffs may belong, for example, to the following groups of dyestuffs: Azo-pigments of the ice color series which are derived from a diazo- or tetrazo-compound free from groups imparting solubility and a coupling component free from groups imparting soluibility, and in which the coupling component is, for example, an aromatic hydroxy-compound such as 2-hydroxynaphthalene, or advantageously a hydroxyaryl-carboxylic acid arylide, an acyl acetylamino-compound or a pyrazolone, and in which one or more azo linkages may be present in the molecule.

As substances of strongly basic action there are used either those of inorganic or organic character. Thus, there may be used, for example, hydroxides, carbonates, alcoholates, enolates or amides of alkali metals, and also ammonia, hydrazine, hydroxylamine or guanidine. As strongly basic organic substances there may be used primary, secondary or tertiary aliphatic, and especially araliphatic or alicyclic amines or polyamines, and also the corresponding quaternary ammonium bases and alkanolamines. There may also be used saturated heterocyclic bases such as pyrrolidine, piperidine, piperazine or morpholine, and also alkali metal salts of amino-carboxylic acids. Especially useful in the present process are, for example, sodium hydroxide, potassium hydroxide, sodium methylate, mono methylamine, ethylene diamine, propylene diamine, hexamethylene diamine, diethylene triamine, triethylene tetramine, tetramethylammonium hydroxide, tetraethanolammonium hydroxide, choline pyrrolidine or trisodium salt of nitrilo-triacetic acid. On the other hand, the aromatic amines, such as aniline and its substitution products, are not sufficiently basic and in the unsaturated heterocyclic amines, such as pyrrole, pyridine, quinoline, isoquinoline, pyrazine and derivatives thereof their basicity is weakened to such an extent by the double bonds that they are not strongly basic substances for the purposes of the present invention.

The liquid or combination of liquids to be used in the present process must possess a certain polarity, namely not too low a dielectric constant, that is to say, a dielectric constant of at least 6. The dielectric constant may be considerably higher than 6, for example, 10–30 or higher. As it is probable that the result achieved by the present invention depends on the formation of ions from the very weak azo-dyestuff acid, the solvent should not possess any appreciably acid properties, that is to say, only an extremely small tendency to split off hydrogen ions. For the purposes of this invention liquids which are usually regarded as neutral, such as water and ethyl alcohol are too strongly acid, so that the value, for example, pK-value, expressing the degree of acidity must be lower than that of ethyl alcohol. This applies, for example, to saturated aliphatic compounds containing only carbon, hydrogen and oxygen, and in which the number of ether groups is at least equal to the number of hydroxyl groups as, for example, in triethylene glycol, ethylene glycol monoethyl ether, diethylene glycol monoethyl ether or the corresponding methyl, butyl or higher alkyl ethers, and also the higher polyethylene glycols having molecular weights from about 100 to 10,000, the products of high molecular weight being used in molten condition, if necessary.

Provided that the liquids comply with the aforesaid requirements with regard to dielectric constant and degree of acidity, they may be chosen from various classes of chemical compounds. They may, as stated above, contain aliphatically bound hydroxyl groups, ether groups, sulfone oxide groups, keto groups, ester groups, lactone groups, carboxylic acid amide groups of at most very weakly acid character or nitrile groups, as in the case, for example, of tetrahydrofurane, dimethyl sulfoxide, acetone, butyl acetate, γ-butyrolactone, dimethylformamide or acetonitrile.

There also come into consideration as at most very weakly acid liquids having a dielectric constant of at least 6 all liquid amines and alcohol amines irrespective of their degree of basicity, for example, monoethylamine, diethylamine, ethylene diamine, mono-, di- or tri-ethanolamine, benzylamine, cyclohexylamine, aniline, dimethylaniline, pyrrole, pyrrolidine, N-methyl-pyrrolidone, pyridine, quinoline, piperidine or morpholine. Accordingly, there may be used as solvent liquids in the presence of a strongly basic substance, amines which owing to their weakly basic character are not used as strongly basic substances. Especially useful as solvent liquids in the present invention are glycol derivatives of high molecular weight, such as triethylene-glycol, ethylene glycol monoethylether, diethylene glycol monoethyl ether and the corresponding methyl ethers, polyethylene glycols and their monoalkyl ethers having molecular weights from about 100 to about 10,000 (if necessary, in the molten condition), condensation products of ethylene oxide with phenols, alkyl-phenols, higher alcohols, amines or carboxylic acids, and also dimethyl-formamide, dimethyl-sulfoxide, ethylene diamine, diethylene triamine or monoethanolamine. Markedly non-polar solvents such as benzine, benzene, cyclohexane, decalin, carbon tetrachloride or carbon disulfide, are unsuitable as solvent liquids in the present invention, but this does not mean that they need be entirely excluded from the solutions. To what extent markedly non-polar or in themselves too strongly acid liquids may be present in the liquid depends on the nature of the dyestuff, the base and the organic liquid used in any particular case.

The choice of the strongly basic substance from the large number of such substances available, on the one hand, and of the solvent liquid, on the other, depends on the nature of the solid material to be dissolved and also on the purpose for which the solution is to be used. In particular, the more sparingly soluble the solid material the stronger should be the base and the more active the liquid used.

In this connection it may be mentioned that among the amines referred to above, which can be used either as strongly basic substances or as weakly to moderately polar liquids, there is a limited number which are capable of fulfilling both functions simultaneously in one and the same composition. In this connection there may be mentioned more especially primary aliphatic amines and polyamines, and also alkanolamines and saturated heterocyclic amines, for example, ethylene diamine, propylene diamine, diethylene triamine and triethylene tetramine. In these amines a large number of azo-dyestuffs of the kind defined above can be brought into solution without the need of any further addition. However, owing to the relatively large quantity of amine required for complete dissolution and owing to the unpleasant character of these amines, this procedure does not come into consideration for practical purposes. It must be supposed that in the case of these amines a substantial proportion thereof acts solely as solvent, because this portion can easily be replaced by non-basic solvents. Moreover, the solvent action of these amines can be considerably enhanced by the addition of a more active strongly basic substance such, for example, as potassium hydroxide, or by the addition of a more active solvent liquid, for example, dimethyl-formamide.

In many cases the process of the invention can be carried out in a very simple manner. Thus, for example, an azo-pigment, which has been obtained by coupling diazotized 2:5-dichloraniline with 2:3-hydroxynaphthoic acid-orthoanisidide, may be suspended in dimethyl-formamide and ammonia gas introduced into the suspension until the pigment completely dissolves. This is accompanied by a strong bathochromic shift in color from red towards blue-violet, which is probably due to halochromism. The same result is produced by adding dropwise to the suspension of the pigment a concentrated aqueous solution of ammonia, while stirring, in such manner that not substantially more ammonia is added than is necessary for complete dissolution of the pigment and therefore only a small amount of water is introduced into the mixture. It is in no way detrimental to the carrying out of the process if in some cases the strongly basic substance is insoluble or only slightly soluble in the solvent liquid. By mechanical mixing of the components the azodyestuff to be dissolved can easily be caused to react with the strongly basic substance so that the resulting probably salt-like reaction product is immediately dissolved in the solvent liquid. Thus, for example, in order to produce a solution of the disazo-pigment, which is obtained by the condensation of one mol of 3:3'-dichlorobenzidine with two mols of an azo-dyestuff carboxylic acid chloride of the formula

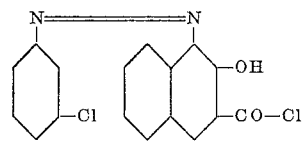

the pigment is suspended in dimethyl-formamide and an adequate quantity of potassium hydroxide in the form of a concentrated aqueous solution or in powder form, or an alcoholate, such as sodium ethylate, in powdered form, is added. Upon vigorously stirring the mixture the pigment rapidly dissolves in the dimethyl-formamide. In the presence of a very small amount of water halochromism from yellow-red towards violet takes place.

It must also be mentioned that when solvent liquids of very weakly acid character, especially glycol ethers and polyglycol ethers and polyglycols are used, a part of the strong alkali used is bound by the solvent liquid. Accordingly, when dyestuff solutions containing such weakly acid solvent liquids are diluted it may in some circumstances be necessary to add further alkali in order to maintain complete dissolution. In the case of other non-acid solvent liquids such as dimethyl formamide and dimethyl sulfoxide, it suffices in many cases to use about the stoichiometric equivalent quantity of the strong alkali, for example, potassium hydroxide, sodium methylate or the like, in order to prepare the solution.

The dyestuff can easily be recovered chemically unchanged by various methods from the solution prepared by the present process. For this purpose it suffices to add water or an acid to the solution. If the strongly basic substance is an easily volatile compound, such as ammonia or a lower amine, the same result can be obtained by allowing the basic substance to evaporate, if desired, by the action of heat, and/or by lowering the pressure.

In certain cases it may be of advantage to precipitate the dissolved substance by the addition of a non-polar solvent.

In the case of a dyestuff which can occur in two or more crystal modifications, which may differ from one another, inter alia, also in their tint, it is possible by dissolving and precipitating the dyestuff in accordance with the present process to convert it into another modification.

The invention also includes various methods of using the solutions so obtained.

Thus, the dyestuff solutions obtained by the present process can be used for dyeing textiles of a very wide variety of natural or artificial fibers by foularding the textile material with the dyestuff solution and then, if desired, after a certain period of time, the dyestuff is reprecipitated by treatment with water or a dilute acid, or by the action of heat if the strongly basic substance is a volatile compound. It has been found that in this manner especially deep and fast dyeings are produced when the dyeing solution used has a swelling action on the textile material. By suitably adjusting the composition of the foularding bath its swelling action can be so regulated that the textile properties of the fiber are not at all or only slightly affected, and the dyestuff solution penetrates into the fiber to a certain extent, so that the pigment precipitated on the fiber is strongly fixed thereon. In the case of fibers of polyacrylonitrile this swelling effect can be produced, for example, by the addition of dimethyl-formamide to the foularding bath. It may also be of advantage to add to the foularding bath another compound, which is not necessary for dissolution of the dyestuff, but is known to have a swelling action on the fibrous material to be dyed.

Another method of carrying out the dyeing process is first to foulard the textile material with a finely dispersed aqueous suspension of the dyestuff and then dry the material. Fixation of the dyestuff on the fiber can then be brought about by passing the textile material through a mixture of a strongly basic substance and a solvent liquid, if desired, in the presence of a compound having a swelling action on the textile material, and then treating the material with water or a dilute acid.

In order to produce especially deep dyeings it may be of advantage to add to the foularding bath or to the after-treatment bath a small amount of a certain type of binding agent, for example, based on an artificial resin.

By the addition of suitable thickening agents, which are appropriate for the liquids used, printing pastes can be prepared from the dyestuff solutions described above, so that prints on textile materials can be produced by methods analogous to those described in the preceding paragraphs for producing dyeings.

The dyestuff solutions produced by the process of this invention can be used for dyeing shaped structures, especially foils or fibers of fully synthetic or semi-synthetic artificial plastics. For this purpose the dyestuff solution is added to the artificial plastic in a liquid or dissolved form or to a chemical precursor thereof, prior to the final shaping operation. During or after the shaping operation, for example, the spinning process, the strongly basic substance used to dissolve the dyestuff and the solvent liquid are removed by the action of water or a dilute acid or, in the case of volatile agents, for example, by the action of heat, whereby the dyestuff is precipitated in the interior of the artificial plastic in a fine submicroscopic state of dispersion. The same result is obtained when the strongly basic substance chemically reacts with the artificial plastic itself at a raised temperature and is bound in this manner.

It is of course necessary in carrying out this form of the process that the dyestuff solution should be compatible with the liquid or dissolved form of the artificial plastic, for example, with the spinning mass. From the very large number of dissolving agents it is therefore necessary to choose an agent appropriate to the particular case. Thus, for example, spun-dyed polyacrylonitrile fibers can be easily produced by adding to the spinning mass a dyestuff solution obtained by dissolving an azo-pigment in dimethyl-formamide with the introduction of gaseous ammonia. The dyed spinning mass may be worked up by the usual dry spinning method, during which the ammonia and the dimethyl-formamide escape in gaseous form. By applying similar principles it is possible to dye lacquers and printing inks.

The present process for producing solutions affords in many cases a convenient method of purifying azo-dyestuffs of the kind hereinbefore referred to. Insoluble impurities can be removed from the solutions by filtration. On the other hand especially easily soluble impurities can be maintained in solution during the reprecipitation by controlled addition of water or acid, and then removed from the filtrate. The present process can, of course, also be used when an azo-dyestuff, which contains weakly acid groups, is present as an impurity in a substance which is insoluble or of considerably better solubility under the conditions of the process. However, it must be borne in mind that certain groups often present in azo-dyestuffs such as carboxylic acid arylamide groups, may undergo hydrolysis if the residence time is too long.

The present process can also be used for stripping the dyestuff from dyeings produced with dyestuffs of the kind hereinbefore referred to, for example, dyeings produced with ice colors, by treating the dyed material with a large quantity of a mixture of a strongly basic substance and a solvent liquid. In this manner faulty dyeings can be corrected or specimens of dyestuffs can be removed from the fiber.

The dyestuff solutions of this invention are especially suitable for dyeing anodically oxidized aluminum, which has been provided in the usual manner with a thin oxide coating, for example, about 10–30μ thick. The dyeing can be carried out by suspending the aluminum in the dyebath in the usual manner. Alternatively depending on the nature of the solvent used or on the shape of the object to be dyed, the dyeing can be brought about by brushing, painting or spraying, and this is advantageous for many purposes.

Finally, the dyestuff solutions produced by the present process are also useful in examining the purity of chemical compounds and the control of their manufacture by physical or physical-chemical methods of measurement which involve the examination of solutions, for example, by spectrophotometry or chromatography.

The following examples illustrate the invention, the parts and percentages being by weight unless otherwise stated and the relationship of parts by weight to parts by volume being the same as that of the gram to the cubic centimeter.

*Example 1*

15 parts of the brown azo-dyestuff obtained from diazotized 2:5-dichloraniline and 1-(2':3'-hydroxynaphthoyl)-amino-2:5-dimethoxybenzene are suspended in 200 parts of acetone, and 3 parts of pulverized sodium ethylate are introduced while stirring. The dyestuff rapidly dissolves during stirring. The solution has a dark scarlet color, and may, if desired, be filtered to remove excess of undissolved sodium methylate. Instead of acetone there may be used, for example, butyl acetate.

Instead of the aforesaid dyestuff, there may be used in an analogous manner, for example:

(a) The red azo-dyestuff obtained from diazotized 4-chloro-2-methyl-1-aminobenzene, and 1-(2':3'-hydroxynaphthoyl)-amino-2-methyl-4-chlorobenzene. Its solution is dark red.

(b) The yellow azo-dyestuff obtained from diazotized ortho-nitraniline and acetoacetic acid anilide. Its solution is brown-red.

By adding water or an acid to the solution of any of the above dyestuffs the dyestuff is precipitated chemically unchanged.

*Example 2*

10 parts of the scarlet red azo-dyestuff obtained from diazotized 2:5-dichloraniline and 1-(2':3'-hydroxynaphthoyl)-amino-2-methoxybenzene are suspended in 100 parts by volume of dimethyl formamide and 6 parts by volume of a 10 N-solution of caustic potash are added at room temperature, while stirring vigorously. In a few minutes a deep violet solution is produced during stirring, and the solution may be filtered to remove undissolved residues. By the addition of water or an acid the dyestuff can be precipitated chemically unchanged. Instead of dimethyl-formamide there may be used as solvent, for example, dimethyl sulfoxide.

Instead of the aforesaid dyestuff there may be used in an analogous manner, for example:

(a) The red azo-dyestuff obtained from diazotized 2:5-dichloraniline and (2':3'-hydroxynaphthoyl)-aminobenzene. Its solution is red-violet.

(b) The red azo-dyestuff obtained from diazotized 2-nitro-1-aminobenzene and 1-(2':3'-hydroxynaphthoyl)-amino-naphthalene. Its solution is deep violet.

(c) The red azo-dyestuff obtained from diazotized 4- methyl-2-nitro-1-aminobenzene and β-naphthol. Its solution is deep red.

Example 3

10 parts of the scarlet red disazo-dyestuff, which has been obtained as described in U.S. Patent No. 2,741,656, filed February 25, 1952, by Max Schmid et al. by condensing 2 mols of the carboxylic acid chloride of the formula

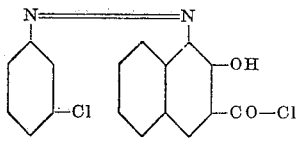

with 1 mol of 3:3'-dichlorobenzidine are suspended in 100 parts by volume of diethylene glycol monoethyl ether and 5 parts by volume of a 10 N-solution of caustic potash are added at room temperature while stirring vigorously. The pigment dissolves in a few minutes, while stirring, to produce a deep red coloration, and the pigment can be precipitated by the addition of water or an acid.

Instead of the aforesaid dyestuff, there may be used in an analogous manner, for example, the orange-red disazo-dyestuff obtained from 1 mol of tetrazotized 3:3'-dichloro-benzidine and 2 mols of 1-phenyl-3-methyl-pyrazolone. In this case the solution is of an intense red-orange color.

Instead of diethylene glycol monoethyl ether there may be used in both cases the same quantity of a liquid polyethylene glycol which is obtained by condensing ethylene glycol with ethylene oxide and has an average molecular weight, for example of 300.

Example 4

10 parts of the yellow disazo-dyestuff, which has been obtained as described in U.S. Patent No. 2,741,656 by condensing 2 mols of the carboxylic acid chloride of the formula

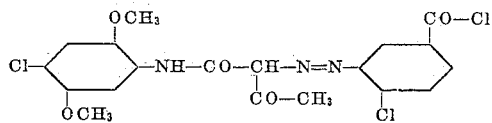

with 1 mol of 3:3'-dichlorobenzidine are suspended in 100 parts by volume of diethylene glycol monoethyl ether and 20 parts by volume of a 10 N-solution of caustic potash are added at room temperature while stirring. Continuing to stir vigorously the disazo pigment dissolves in the course of 5–10 minutes to produce a yellow-brown coloration, and the pigment can be precipitated from the solution by the addition of water or an acid.

Instead of the aforesaid glycol derivative there may be used as solvent the same quantity of a liquid polyethylene glycol having an average molecular weight, for example, of 300.

Example 5

16 parts of the dyestuff obtained from diazotized 2:5-dichloro-1-aminobenzene and 1 - (2':3'-hydroxy-naphthoyl)-amino-2-methoxy-benzene are made into a paste with 50 parts of dimethyl-formamide. By the addition of 60 parts of ethylene diamine there is obtained a clear solution, and the solution is made up to 1000 parts per volume by the addition of dimethyl-formamide. A fabric of super polyamide fibers is impregnated on a foulard with the solution so obtained, and the fabric is squeezed so that its content of liquid is about 70%. The fabric is then acidified with aqueous sulfuric acid of 5% strength, then rinsed and soaped at 95° C. for 15 minutes in a bath which contains, per liter of water, 5 grams of soap and 2 grams of anhydrous sodium carbonate. There is obtained a scarlet red dyeing having a full feel.

An even stronger dyeing having an equally good feel can be produced by using a fabric of polyacrylonitrile staple fibers, such as is obtainable under the name "Orlon-Spun."

Example 6

14 parts of the dyestuff obtained from diazotized 2:5-dichloro - 1 - aminobenzene and 1-(2':3'-hydroxynaphthoyl)-amino-2-methoxy-benzene are dissolved in 50 parts of monoethanolamine and 100 parts of hexamethylene diamine, the solution is made up to 1000 parts by volume by the addition of further monoethanolamine, and a fabric of super polyamide fibers or of polyacrylonitrile fibers of polyester fibers is foularded with the solution so obtained. The procedure is otherwise the same as described in Example 5, and there are obtained scarlet-red dyeings having an agreeable soft feel.

A very similar result is obtained by using morpholine instead of ethanolamine.

Example 7

3 grams of the dyestuff of the formula

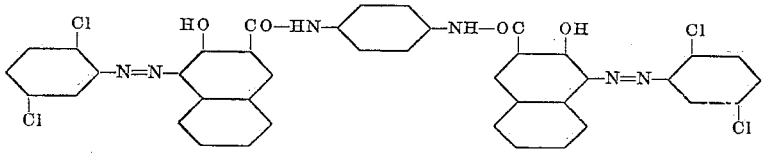

are suspended in 200 cc. of dimethyl-formamide. There are added 1.5 grams of pulverized caustic potash. By vigorous agitation of the mixture for 15 minutes there is obtained a violet-red solution of the dyestuff, which is filtered to remove a small amount of residual matter.

A sheet of pure aluminum, which may be dry or wet with water and of which the surface is anodically oxidized is suspended for 5 minutes in the dyestuff solution; the sheet is then thoroughly washed in running water, and boiled for 30 minutes in distilled water. A strong red-orange dyeing which is fast to rubbing is obtained.

A dyeing of the same tint and strength can also be produced by diluting the dyebath, for example, to 5 times its volume, by the addition of further dimethyl-formamide, and the dyed material is kept in the dyebath for a longer time, for example, about 15–20 minutes. In order to regulate the tint produced, the foregoing procedure may be interrupted several times and the wet sheet washed and again introduced into the dyebath.

Example 8

1.5 parts of the azo-pigment, obtained by coupling diazotized ortho-nitraniline with aceto-acetic acid anilide (Hansa yellow 5 G), are suspended in 20 parts per volume of acetone and 0.6 part per volume of a 10 N-solution of caustic potash is added. By vigorously agitating the mixture the pigment is rapidly and completely dissolved to produce a brown-red coloration. The dyestuff solution is added to a solution of 150 parts of acetyl cellulose in 564 parts of acetone, and is uniformly distributed therein by stirring. From the resulting dyed spinning solution cellulose acetate silk fibers are produced by the known dry spinning process, and the resulting fibers have a full clear yellow color and contain the greater part of the dyestuff in sub-microscopic dispersion (only isolated particles are visible up to ½μ diameter). 0.3 part of powdered sodium ethylate can be used with equal success, instead of the caustic potash solution.

Example 9

0.05 part of the azo-pigment, obtained by coupling diazotized 2:5-dichloro-aniline with 2:3 hydroxynaphthoic acid ortho-anisidide is suspended in 40 parts of dimethylformamide and ammonia gas is introduced, whereupon the pigment dissolves rapidly and completely giving a red-violet coloration. In the resulting dyestuff solution there are dissolved 5 parts of polyacrylonitrile powder, while stirring, whereby a viscous red-violet mass is produced, which contains the dyestuff in dissolved form. If the resulting mass is brushed on to a support in the form of a thin coating and the resulting coating is immediately subjected to a temperature of 200° C. a film is obtained which has a clear scarlet red color and contains the pigment in very fine and uniform dispersion (particle diameter=½μ and less).

Spun-dyed (Orlon) fibers can be produced from the resulting mass by the known dry spinning process. It may be of advantage to use instead of ammonia, a basic substance, for example, an amine, of which the boiling point is in the vicinity of the boiling point of dimethyl formamide.

Example 10

1 gram of the azo-dyestuff of the formula

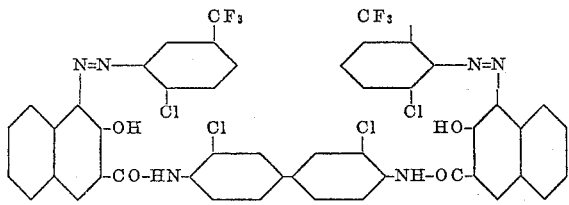

is suspended in 19 grams of dimethyl-formamide. Monomethylamine is introduced while agitating the mixture until complete dissolution has occurred. The increase in weight amounts to 1.7 grams; the resulting bordeaux red solution contains 4.6% of dissolved dyestuff.

A quantity of the resulting solution is incorporated, while stirring well, into an ordinary Orlon spinning solution (a solution of polyacrylonitrile in dimethyl-formamide) such that the mixture contains 1% of dyestuff calculated on the polyacrylonitrile. The dyestuff is present in the Orlon spinning solution so as to impart thereto a bordeaux red color due to the dyestuff being dissolved therein. The colored composition is cast on to a glass plate as a thin film and is immediately dried at 110° C. A scarlet red polyacrylonitrile film is obtained.

Instead of monomethylamine, there may be used with the same success ethylene diamine.

By using, instead of the aforesaid dyestuff, 0.2 gram of the dyestuff of the formula

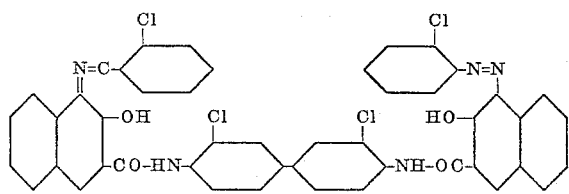

the increase in weight is about 1.25 grams and there is obtained a bordeaux red solution. A spinning solution prepared therewith can be used in the same manner to produce an orange film.

Either of the above solutions can be spun in an ordinary spinning apparatus.

Example 11

A powerful stream of monomethylamine is introduced into a suspension of 1.5 parts of the dyestuff of the formula

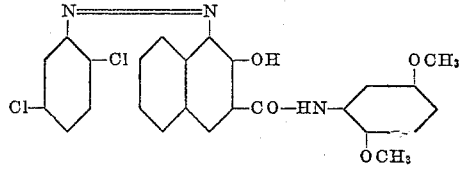

in 80 parts of acetone. After 10 minutes the temperature is raised to 60° C. and the dyestuff is almost completely dissolved. The solution is decanted from a small amount of sediment, and the clear strongly yellow solution is stirred into a solution of 150 parts of acetyl-cellulose in 564 parts of acetone. By spinning the solution by the usual dry spinning process there are obtained yellow filaments, of which the tint changes towards brown when the filaments are heated for one hour at 100° C.

Example 12

Monomethylamine is introduced in the manner described in Example 11 into a suspension of 0.5 part of the dyestuff used in Example 11 in 25 parts of acetone. The clear solution is stirred into 100 parts of an acetyl-cellulose lacquer, which contains 10 parts of film-forming material. The strongly yellow lacquer is coated in a thin layer on an aluminum foil, and the latter is immediately heated in a drying cabinet at 100° C. There is obtained a transparent strongly red-brown coating of lacquer.

Example 13

A mixture of 0.5 part of the dyestuff of the formula

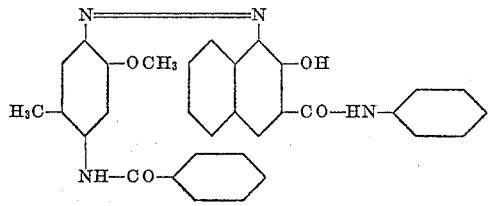

0.2 part of sodium methylate and 25 parts of dimethyl-sulfoxide is powerfully agitated for 15 minutes at room temperature, during which the pigment dissolves to give a deep red coloration.

1 part of the resulting solution is stirred into 20 parts of a solution of 2 parts of cellulose triacetate in 18 parts of a 9:1-mixture of methylene chloride and ethyl alcohol. A test portion of the transparent ruby red mass is placed on a glass plate and spread with a second plate. The coating is allowed to dry for a short time and the glass plate is placed in water for 10 minutes in order to develop the tint. After drying, there is obtained a transparent foil having a strong violet color. Under conditions useful for spinning the mass can be spun.

Example 14

A mixture of 0.5 part of the dyestuff used in Example 13, 0.2 part of sodium methylate and 50 parts of acetone is vigorously stirred at room temperature for 15 minutes, during which the pigment dissolves to give a deep red coloration.

Furthermore, 5 parts of powdered polyvinyl chloride are agitated for a short time with 40 parts of acetone, then 40 parts of carbon disulphide are added, and the whole is again agitated. To bring about complete clear dissolution the mixture is allowed to stand overnight.

Into the resulting solution are stirred 5 parts of the above pigment solution. A mixture of 1 part of acetone and 0.1 part of glacial acetic acid is then added to the ruby red solution of polyvinyl chloride. The color of the solution changes instantaneously from red to violet. By casting a film from the solution there is obtained a transparent violet colored foil. When the solution is spun violet filaments are produced.

Example 15

Monomethylamine is passed for 20 minutes into a suspension of 1.5 part of the dyestuff of the formula

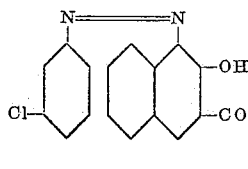 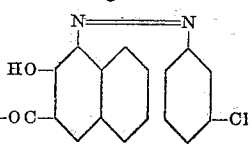

in 15 parts of dimethyl sulfoxide. The pigment completely dissolves to give a deep red coloration.

0.465 part of the resulting solution (=0.038 part of dyestuff) is added to a mixture of 13 parts of polyvinyl chloride and 6 parts of dioctylphthalate and the whole is well mixed with a spatula. The colored mass is placed on a 2-roller mechanism heated at 150° C., rolled for 5 minutes so as finally to produce a sheet 0.25 mm. thick. The foil so obtained has a strong orange color and is completely transparent.

Example 16

5 parts of nylon fabric are foularded with 100 parts of a solution of 2.75 parts of the dyestuff of the formula

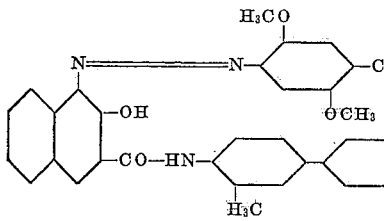 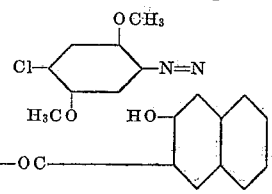

and 3.1 parts of a 10 N-solution of potassium hydroxide in 94.15 parts of ethylene glycol monoethyl ether at room temperature, and the fabric is squeezed so that its increase in weight amounts to 3.35 parts. The fabric is then allowed to stand for 15 minutes at about 130° C., then treated for 5 minutes at room temperature with about 200 parts of sulfuric acid of 5 percent strength, and the fabric is thoroughly rinsed with water containing a small amount of ammonia. Finally, the fabric is washed at the boil for 15 minutes with about 200 parts of a solution which contains, per liter of water, 5 grams of soap and 2 grams of anhydrous sodium carbonate, then rinsed with water and dried. The fabric is dyed a strong violet tint.

By treating Perlon fabric in the same manner it is likewise dyed a strong violet tint.

Example 17

5 parts of a nylon fabric are foularded at room temperature with 100 parts of a solution of 4 parts of the dyestuff of the formula

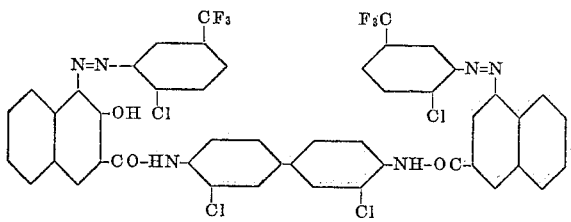

and 2.3 parts of a 10 N-solution of potassium hydroxide in 83.7 parts of ethylene glycol monoethyl ether and 10 parts of water, and the fabric is then squeezed so that its increase in weight amounts to 3.1 parts. When aftertreated in the manner described in Example 16, the fabric is dyed a scarlet-red tint.

By treating Perlon, Orlon or Terylene fabrics in the manner described above they are likewise dyed a scarlet red tint.

By treating a nylon, Perlon or Orlon fabric with a solution of 2.4 parts of the dyestuff used in Example 16 and 2.7 parts of a 10 N-solution of potassium hydroxide in 84.9 parts of ethylene glycol monoethyl ether and 10 parts of water in the same manner, there is obtained a strong violet tint.

Example 18

5 parts of a fabric of polyethylene terephthalate (Terylene) are dyed in 100 parts of the dyestuff solution used in Example 16 at about 80° C. for 15 minutes, and the fabric is then squeezed so that the fabric contains 3.85 parts of the dyestuff solution. The fabric is then allowed to stand for 15 minutes at about 80° C., and is then finished in the manner described in Example 16. The fabric is dyed a strong violet tint.

Cellulose triacetate fabric can be through-dyed a deep violet tint by the same treatment.

Example 19

5 parts of a fabric of polyacrylonitrile (Orlon) are foularded at room temperature with 100 parts of a solution of 1.5 parts of the dyestuff used in Example 16 and 1.7 parts of a 10 N-solution of potassium hydroxide in 76.8 parts of ethylene glycol monoethyl ether and 20 parts of dimethyl-formamide, and then the fabric is squeezed so that its increase in weight amounts to 3.2 parts. After being subjected to the further treatment described in Example 16 the fabric has a strong violet tint.

Example 20

5 parts of a Terylene fabric are foularded at room temperature with 100 parts of a solution of 1.25 parts of the dyestuff used in Example 16 and 1.4 parts of a 10 N-solution of potassium hydroxide in 67.35 parts of ethylene glycol monoethyl ether and 30 parts of diethylene triamine, and the fabric is then squeezed so that its increase in weight amounts to 3.3 parts. The fabric is then allowed to stand for 15 minutes at about 80° C., and is then finished in the manner described in Example 16. The fabric has a strong violet tint.

Nylon and Perlon fabrics can likewise be dyed a strong violet tint by the same treatment.

If the Terylene fabric, after being squeezed, is allowed to stand for 15 minutes at room temperautre, instead of at about 80° C., a strong violet tint is likewise obtained.

Example 21

5 parts of a cellulose acetate artificial silk fabric are foularded at room temperature with 100 parts of a soluiton of 4.25 parts of the dyestuff used in Example 17 and 1.8 parts of 10 N-solution of potassium hydroxide in 83.95 parts of diethylene glycol monomethyl ether and 10 parts of water, and the fabric is then squeezed so that its increase in weight amounts to 3.3 parts. The fabric is then allowed to stand for 15 minutes at room temperature, and is then finished in the manner described in Example 16. The fabric has a strong scarlet red tint.

Strong scarlet red dyeings are likewise produced in the same manner on delustred cellulose acetate silk fabric and on Terylene fabric.

Example 22

5 parts of a Terylene fabric are foularded at room temperature with 100 parts of a solution of 4.85 parts of the dyestuff of the formula

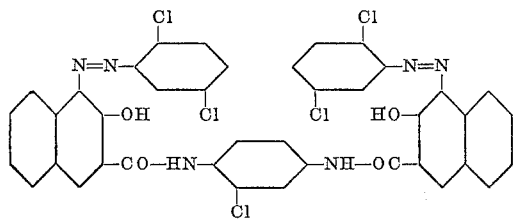

and 2.7 parts of a 10 N-solution of potassium hydroxide in 92.45 parts of diethylene glycol monomethyl ether, and the fabric is then equeezed so that its increase in weight amounts to 3.5 parts. The fabric is then immediately acidified and finished in the manner described in Example 16. The fabric is dyed a full red tint.

*Example 23*

5 parts of a Perlon fabric are foularded at room temperature with 100 parts of a solution of 2.35 parts of the dyestuff of the formula

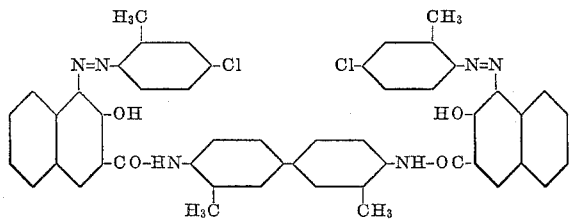

and 2 parts of a 10 N-solution of potassium hydroxide in 87.65 parts of diethylene glycol monomethyl ether and 8 parts of water, and then the fabric is squeezed so that its increase in weight amounts to 3.4 parts. The fabric is further treated and finished in the manner described in Example 16, and is then dyed a powerful bordeaux red tint.

*Example 24*

5 parts of a fabric of cellulose triacetate are foularded at about 80° C. with 100 parts of a solution of 3.6 parts of the dyestuff of Example 16 and 2.5 parts of a 10 N-potassium hydroxide solution in 93.9 parts of diethylene glycol monomethyl ether; the fabric is then squeezed so that its increase in weight amounts to 3.25 parts. The fabric is further treated and finished in the manner described in Example 16, and it then has a full throughdyed violet tint.

*Example 25*

5 parts of a cellulose triacetate fabric are foularded at about 80° C. with 100 parts of a solution of 2.5 parts of the dyestuff used in Example 16 and 1.75 parts of a 10 N-solution of potassium hydroxide and 11 parts of tetramethylammonium hydroxide in 70.75 parts of diehtylene glycol momomethyl ether and 14 parts of water, and the fabric is then squeezed so that its increase in weight amounts to 2.9 parts. After being finished in the manner described in Example 16, the fabric has a full through-dyed violet tint.

The fastness to rubbing of the dyeings produced in the foregoing examples may, if desired, be enhanced by treatment with an artificial resin.

It is to be understood that the azo dyestuffs from which solutions may be readily made according to the present invention are not completely insoluble in organic solvents such as acetone, diacetone alcohol, diethylene glycol monoethyl ether, dimethylformamide, dimethylsulfoxide, glycol monoethyl ether, and γ-valerolactone without the addition of a strongly alkaline substance. However their solubility in the said solvents is very slight usually not exceedng 5 parts of dyestuff in 1000 parts of solvent at room temperature (20° C.). The term "insufficiently soluble" is intended to mean a solubility less than 10 parts of dyestuff in 1000 parts of any of the solvents mentioned above at room temperature.

What is claimed is:

1. A solution of an azo dyestuff selected from the group consisting of azo dyestuffs of the formulae

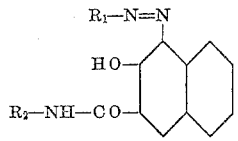

and

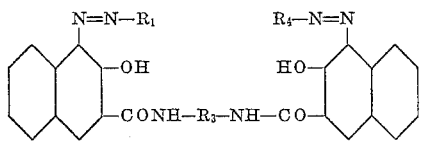

wherein $R_1$ and $R_4$ each stands for a benzene radical, $R_2$ stands for a radical selected from the group consisting of benzene and naphthalene radicals, and $R_3$ stands for a radical selected from the group consisting of phenylene and diphenylene radicals, all the radicals $R_1$, $R_2$, $R_3$ and $R_4$ being free from ionizing groups; the said solution comprising in addition to the said dyestuff a substance of strongly basic action selected from the group consisting of ammonia, an alkali metal hydroxide and an alkali metal alcoholate, and an organic liquid which has a dielectric constant of at least 6 and an acidity less than that of methyl alcohol and ethyl alcohol.

2. A solution of an azo dyestuff as claimed in claim 1, wherein said organic liquid is dimethyl formamide.

3. A solution of an azo dyestuff as claimed in claim 1, wherein said organic liquid is a polyglycol in which the number of ether groups is at least equal to the number of hydroxyl groups.

4. A solution of an azo dyestuff as claimed in claim 1, wherein said organic liquid is an aliphatic compound containing only carbon, hydrogen and oxygen and in which the number of ether groups is at least equal to the number of hydroxyl groups.

References Cited in the file of this patent

UNITED STATES PATENTS

| | | |
|---|---|---|
| 1,977,345 | Moore | Oct. 16, 1934 |
| 2,132,619 | Hill | Oct. 11, 1938 |
| 2,132,620 | Hill | Oct. 11, 1938 |
| 2,137,830 | Berliner | Nov. 22, 1938 |
| 2,225,604 | Lubs et al. | Dec. 17, 1940 |
| 2,383,995 | Stanley | Sept. 4, 1945 |
| 2,393,652 | Olpin | Jan. 29, 1946 |
| 2,717,823 | Lowe | Sept. 13, 1955 |
| 2,741,534 | Pedersen | Apr. 10, 1956 |
| 2,743,991 | Schoonover | May 1, 1956 |
| 2,839,523 | Towne et al. | June 17, 1958 |
| 2,852,504 | Towne et al. | Sept. 16, 1958 |
| 2,899,420 | Funke | Aug. 11, 1959 |

OTHER REFERENCES

Colour Index, vol. 3, p. 3326, Soc. of Dyers and Colourists.